(12) United States Patent
Park et al.

(10) Patent No.: US 7,991,938 B2
(45) Date of Patent: Aug. 2, 2011

(54) BUS WIDTH CONFIGURATION CIRCUIT, DISPLAY DEVICE, AND METHOD CONFIGURING BUS WIDTH

(75) Inventors: Hyun-Young Park, Seoul (KR); Do-Kyung Kim, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 163 days.

(21) Appl. No.: 11/828,665

(22) Filed: Jul. 26, 2007

(65) Prior Publication Data

US 2008/0086582 A1    Apr. 10, 2008

(30) Foreign Application Priority Data

Jul. 26, 2006 (KR) .................. 10-2006-0070383

(51) Int. Cl.
G06F 13/40 (2006.01)
(52) U.S. Cl. .............................. 710/307; 710/33; 710/66
(58) Field of Classification Search .................. 710/307, 710/66, 71, 315, 313, 33
See application file for complete search history.

(56) References Cited

U.S. PATENT DOCUMENTS

| | | | | |
|---|---|---|---|---|
| 5,613,078 A * | 3/1997 | Kishigami | 710/307 |
| 5,764,927 A * | 6/1998 | Murphy et al. | 710/105 |
| 5,911,053 A * | 6/1999 | Pawlowski et al. | 710/307 |
| 5,978,870 A * | 11/1999 | Warren | 710/71 |
| 6,014,720 A * | 1/2000 | Wang et al. | 710/307 |
| 6,047,347 A * | 4/2000 | Hansen et al. | 710/307 |
| 6,748,469 B1 * | 6/2004 | Caldwell et al. | 710/71 |
| 7,162,563 B2 * | 1/2007 | Matsui et al. | 710/307 |
| 7,225,290 B2 * | 5/2007 | Barth et al. | 710/316 |
| 7,234,031 B2 * | 6/2007 | Yim et al. | 711/154 |
| 7,308,514 B1 * | 12/2007 | Hewitt et al. | 710/66 |
| 7,363,441 B2 * | 4/2008 | Yim et al. | 711/154 |
| 7,366,816 B2 * | 4/2008 | Rai | 710/307 |
| 7,370,132 B1 * | 5/2008 | Huang et al. | 710/307 |
| 7,426,597 B1 * | 9/2008 | Tsu et al. | 710/307 |
| 2004/0137805 A1 * | 7/2004 | Mylly et al. | 439/894 |
| 2005/0248657 A1 * | 11/2005 | Hsiao et al. | 348/207.1 |
| 2007/0067548 A1 * | 3/2007 | Juenger | 710/315 |
| 2007/0233926 A1 * | 10/2007 | Chang | 710/301 |

FOREIGN PATENT DOCUMENTS

JP     09-204354     8/1997

(Continued)

OTHER PUBLICATIONS

John, Lizy. VaWiRAM: A Variable Width Random Access Memory MOdule. IEEE. 1995.*
Ahmadi et al. Multiple-Width Bus Partitioning Approach to Datapath Synthesis. IEEE. 2007.*
Intel Corporation. i960 RP Processor: A Single-Chip Intelligent I/O Subsystem. Technical Brief. 1995.*
English Abstract Publication No. 2006-148808.
English Abstract Publication No. 1020040110925.

*Primary Examiner* — Matthew D Spittle
(74) *Attorney, Agent, or Firm* — F. Chau & Associates, LLC (57) ABSTRACT

A display device communicating with a microcontrol unit by data, including: a panel with a plurality of pixels; and a display driver operating to drive the panel, in which the display driver includes: a data bus with a plurality of widths; a register storing an index and parameter input from the microcontrol unit through the data bus; and a bus width control circuit selecting one of the plurality of widths with reference to the index and parameter stored in the register and conducting data communication with the microcontrol unit by means of the selected bus width. An index or parameter is introduced for transferring information to configure a data bus width, so that it is possible to reduce the number of mode set pins for determining the data bus width.

20 Claims, 8 Drawing Sheets

FOREIGN PATENT DOCUMENTS

| | | |
|---|---|---|
| JP | 10-063617 | 3/1998 |
| JP | 2004-070711 | 3/2004 |
| JP | 2006-148808 | 6/2006 |
| KR | 1020000065377 A | 11/2000 |
| KR | 1020030024890 A | 3/2003 |
| KR | 1020040110925 | 12/2004 |

* cited by examiner

| IM3 | IM2 | IM1 | IM0 | Description |
|---|---|---|---|---|
| 0 | 0 | 0 | 0 | 68-system 16-bit bus interface |
| 0 | 0 | 0 | 1 | 68-system 8-bit bus interface |
| 0 | 0 | 1 | 0 | 80-system 16-bit bus interface |
| 0 | 0 | 1 | 1 | 80-system 8-bit bus interface |
| 0 | 1 | 0 | ID | Serial peripheral interface(SPI) |
| 0 | 1 | 1 | * | Reserved |
| 1 | 0 | 0 | 0 | 68-system 18-bit bus interface |
| 1 | 0 | 0 | 1 | 68-system 9-bit bus interface |
| 1 | 0 | 1 | 0 | 80-system 18-bit bus interface |
| 1 | 0 | 1 | 1 | 80-system 9-bit bus interface |
| 1 | 1 | * | * | Reserved |

| Pins | | | Registers | | Description |
|---|---|---|---|---|---|
| IM1 | IM0 | | Index | parameter | |
| 0 (Parallel) | 0 (80 mode) | | ≠23h (9/8bit) | 80xxh | 80-system 8-bit bus interface |
| | | | | 00xxh | 80-system 9-bit bus interface |
| | | | 23h (18/16bit) | 80xxh | 80-system 16-bit bus interface |
| | | | | 00xxh | 80-system 18-bit bus interface |
| | 1 (68 mode) | | ≠23h (9/8bit) | 80xxh | 68-system 8-bit bus interface |
| | | | | 00xxh | 68-system 9-bit bus interface |
| | | | 23h (18/16bit) | 80xxh | 68-system 16-bit bus interface |
| | | | | 00xxh | 68-system 18-bit bus interface |
| 1 (Serial) | ID | | X | X | Serial peripheral interface(SPI) |

BUS WIDTH CONFIGURATION CIRCUIT, DISPLAY DEVICE, AND METHOD CONFIGURING BUS WIDTH

CROSS-REFERENCE TO RELATED APPLICATION

This U.S. non-provisional patent application claims priority under 35 U.S.C. §119 of Korean Patent Application 2006-70383 filed on Jul. 26, 2006, the entire contents of which are hereby incorporated by reference.

BACKGROUND

The present disclosure relates to display systems. In particular, the present disclosure relates to a device and method for configuring a data bus width between a microcontrol unit (MCU) and a display device.

Display systems generally include display devices and MCUs for driving the display devices. Display systems are widely used in portable electronic mobile phones, MP3 players, digital cameras, and so on.

Figure 1:
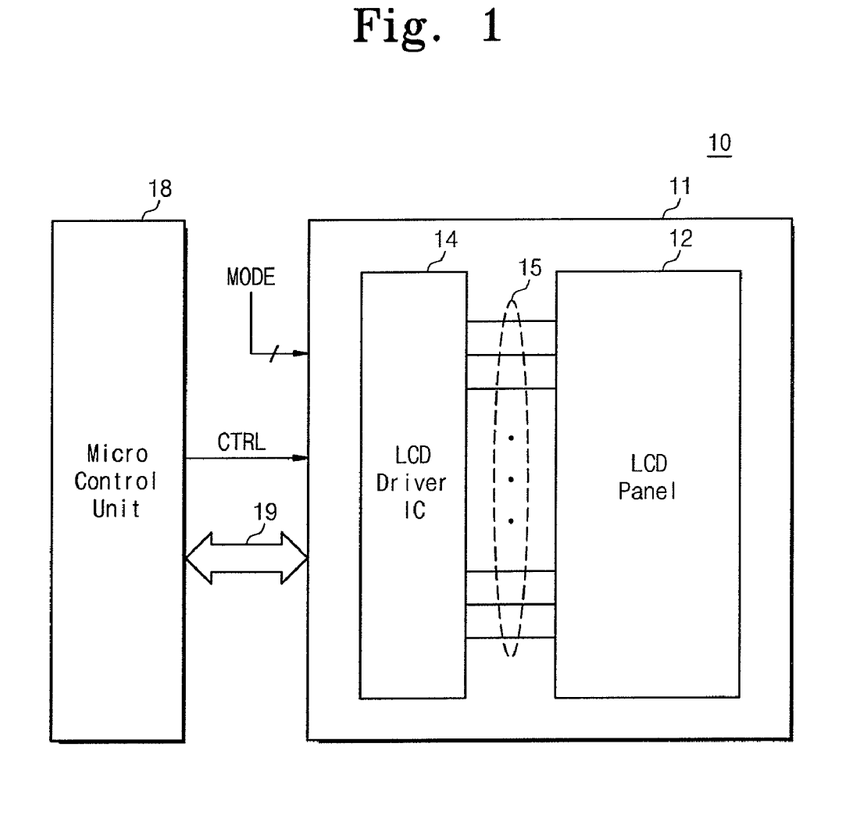
FIG. 1 is a block diagram of a general display device.

FIG. 1 is a block diagram of a general display device. Referring to FIG. 1, the display system 10 includes a display device 11 and an MCU 18. The display device 10 and the MCU 18 exchange data with each other through a data bus 19.

The display device 11 includes an LCD panel 12 and an LCD driver IC 14. The LCD driver IC 14 is formed in a single semiconductor chip. The LCD driver IC 14 provides a drive signal to the LCD panel 12 by way of signal lines 15. The MCU 18 provides a control signal CTRL and data to the display device 11. The MCU 18 controls the display device 11, enabling an image to be output as a picture.

Continuing on in FIG. 1, the display device 11 has mode set pins MODE for setting an operation mode. The mode set pins MODE are connected to a power source voltage or a ground voltage on a printed circuit board (PCB) (not shown). The mode set pins MODE, as external pins in general, are fixed on the PCB. The mode set pins MODE, however, need not be always fixed to a PCB, being supplied with a mode signal from the MCU 18.

The MCU 18 has a variable interface mode in accordance with its type. For instance, the MCU 18 may have the 68-series interface mode of Motorola, or an 80-series interface mode of Intel. Further, even in MCUs made by the same manufacturer, they may be designed so that each has a different data bus width. For example, Intel's 80-series CPU has a data bus width of 8, 9, 16, or 18 bits.

The display device 11 is required to set an operation mode in accordance with an interface mode of the MCU 18 by using the mode set pins MODE before communication, for example, at the first system reset time. For example, the display device 11 sets an operation mode through the mode set pins MODE, whether the MCU 18 is Motorola's 68-series interface mode or Intel's 80-series interface mode.

As such, the easiest way for setting an operation mode of the display system 10 is to use the mode set pins MODE. If there is an increase of a data bus width and interface mode of the MCU 18, however, the number of mode set pins MODE also increases.

Increasing the mode set pins in number for various operation modes, however, makes a systemic burden heavier in operation. Namely, increasing the number of the mode set pins, extends the whole area occupied by all signal lines in the display system. As it is necessary to change a set value of an operation mode by the MCU 18, a hardware structure must be modified. Further, from an increase in the number of the mode set pins MODE, it also complicates a PCB pattern for fixing the mode set pins on a PCB. Thus, there is a problem of fabricating a new PCB pattern in such case.

SUMMARY OF THE INVENTION

Exemplary embodiments of the present invention are directed to solve the problems in conventional systems by providing a bus width configuration circuit and method capable of adjusting a data bus width and interface mode of an MCU and reducing the number of mode set pins.

Exemplary embodiments of the present invention are further directed to a display device including the bus width configuration circuit.

An exemplary embodiment of the present invention provides a bus width configuration circuit including: a data bus with a plurality of widths; a register storing an index and a parameter input through the data bus; and a bus width control circuit selecting one of the plurality of widths with reference to the index and the parameter stored in the register and conducting data communication by means of the selected bus width.

As an exemplary embodiment, the bus width control circuit includes: a selection signal generator receiving the index and parameter stored in the register and generating a bus selection signal; and a bus selector operating to select one of the plurality of widths in response to the bus selection signal.

The data bus is configured in one of the plurality of widths for a common bus. The register comprises an upper index register, a lower index register, and a parameter register. The selection signal generator operates to generate the bus selection signal with reference to the index stored in the upper or lower index register, or with reference to the parameter stored in the parameter register.

As an exemplary embodiment, the plurality of widths include 8-bit, 9-bit, 16-bit, and 18-bit widths. The bus width control circuit selects one of the plural widths.

Another exemplary embodiment of the present invention provides a display device communicating with a microcontrol unit by data, including: a panel with a plurality of pixels; and a display driver operating to drive the panel, in which the display driver includes: a data bus with a plurality of widths; a register storing an index and parameter input from the microcontrol unit through the data bus; and a bus width control circuit selecting one of the plurality of widths with reference to the index and the parameter stored in the register and conducting data communication with the microcontrol unit by means of the selected bus width.

As an exemplary embodiment, the display device further includes a mode set pin establishing one of serial and parallel communication modes between the microcontrol unit and the display driver. The display device further includes a mode set pin establishing the microcontrol unit to one of an Intel 80-series CPU and a Motorola 68-series CPU.

As an exemplary embodiment, the data bus is configured in one of the plurality of widths for a common bus. The plurality of widths includes 8-bit, 9-bit, 16-bit, and 18-bit widths. The bus width control circuit selects one of the plurality of widths.

According to an exemplary embodiment, the register includes an upper index register, a lower index register, and a parameter register. The bus width control circuit operates to generate the bus selection signal with reference to the index stored in the upper or lower index register, or with reference to the parameter stored in the parameter register.

An exemplary embodiment of the present invention further provides a method of configuring a bus width of a display device including a data bus with a plurality of widths, a register storing an index or a parameter, and a bus width control circuit conducting data communication with a microcontrol unit in one of the plurality of widths. The method is comprised of: receiving the index and parameter from the microcontrol unit through the data bus and storing the index and parameter into the register; selecting one of the plurality of widths with reference to the index or the parameter stored in the register; and communicating with the microcontrol unit by data in the selected bus width.

As an exemplary embodiment, the data bus is configured in one of the plurality of widths for a common bus through which a first index is transferred.

In an exemplary embodiment, the display unit includes one or more mode set pins and establishes the mode set pins before receiving the index or the parameter. The method is further comprised of determining an interface mode from serial and parallel communication modes between the microcontrol unit and the display device by means of the mode set pins. The method is further comprised of determining a type of the microcontrol unit from either Intel's 80-series CPU or Motorola's 68-series CPU by means of the mode set pins.

As an exemplary embodiment, the plurality of widths include 8-bit, 9-bit, 16-bit, and 18-bit widths. Selecting the width is carried out with selecting one of the plurality of widths.

A further understanding of the nature and advantages of the present invention herein may be realized by reference to the remaining portions of the specification and the attached drawings.

BRIEF DESCRIPTION OF THE FIGURES

Exemplary embodiments of the present invention will be understood in more detail from the following descriptions taken in conjunction with the following figures, wherein like reference numerals refer to like parts throughout the various figures unless otherwise specified. In the figures.

DETAILED DESCRIPTION OF EXEMPLARY EMBODIMENTS

Exemplary embodiments of the invention will be described below in more detail with reference to the accompanying drawings. The invention may, however, be embodied in different forms and should not be constructed as limited to the exemplary embodiments set forth herein. Rather, these exemplary embodiments are provided so that this disclosure will be thorough and complete, and will fully convey the scope of the invention to those of ordinary skill in the art.

Figure 2:
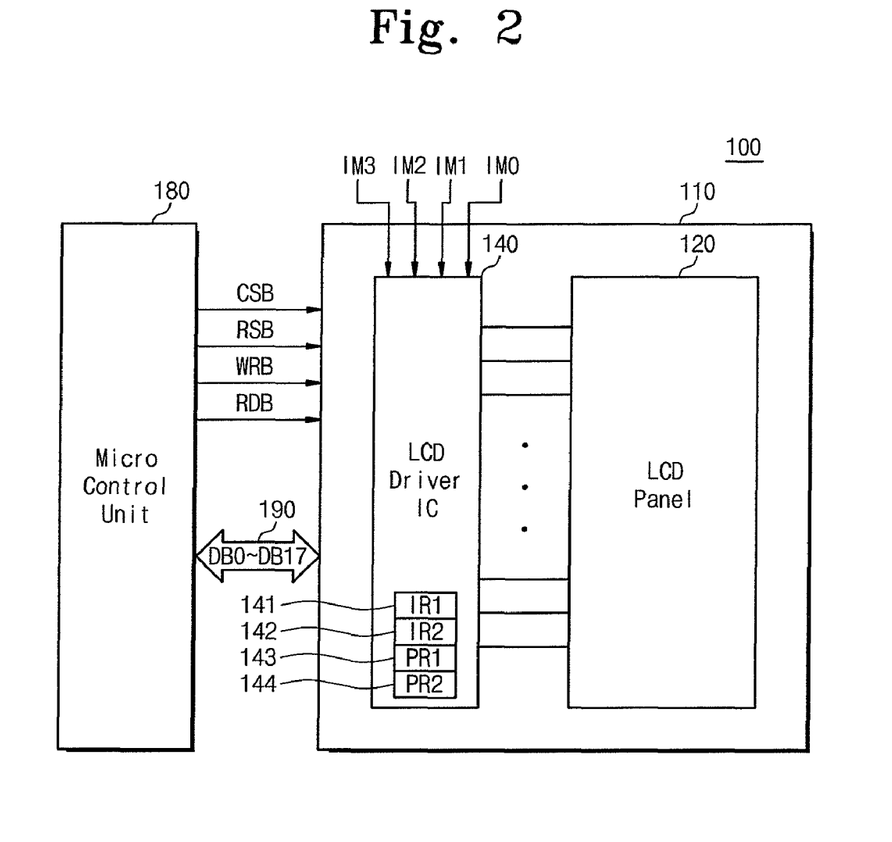
FIG. 2 is a block diagram illustrating a display system according to an exemplary embodiment of the present invention.
Figure 5:
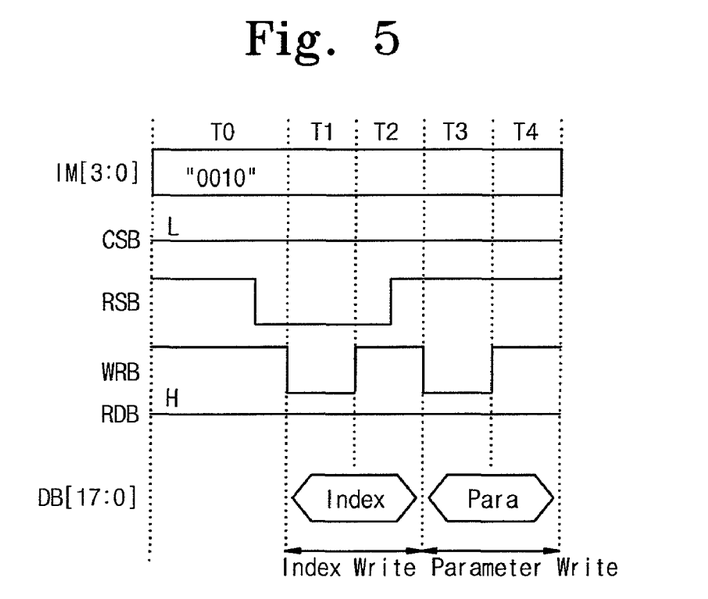
FIG. 5 is a timing diagram showing an operation of the display device if the microcontrol unit shown in FIG. 2 is associated with an 80-series 16-bit bus interface.

To aid in appreciating the features of exemplary embodiments of the present invention, FIGS. 2 and 5 show a display system configuring an operation mode by means of four mode set pins IM0~IM3 and, FIGS. 6 through 9 show a display system configuring an operation mode by means of two mode set pins IM0 and IM1. Through these two exemplary embodiments, the present invention will be understood as providing the feature of adjusting a data bus width and interface mode of a microcontrol unit (MCU) and reducing the number of mode set pins.

FIG. 2 is a block diagram illustrating an exemplary embodiment of a display system. Referring to FIG. 2, the display system 100 includes a display device 110 and an MCU 180.

The display device 110 receives control signals CSB, RSB, WRB, and RDB from the MCU 180. The display device 110 exchanges data with the MCU 180 through data buses DB0~DB17. The display device 110 is associated with the four mode set pins IM0~IM3 for configuring an operation mode.

Referring to FIG. 2, the display device 110 is comprised of an LCD panel 120 and an LCD driver 140. The LCD panel outputs image data as a picture under control by the LCD driver 140. The LCD driver 140 configures the display device 110 by means of the mode set pins IM0~IM3 in various operation modes. In FIG. 2, as the number of mode set pins IM0~IM3 is 4, the display device 110 is able to configure 16 (2×4) operation modes in total. The LCD driver 140 is comprised of a register circuit that includes index registers 141 and 142, and parameter registers 143 and 144. The register circuit will be described in more detail in the following.

The MCU 180 may be a baseband processor (BBP) or application engine made up of Motorola's 68-series CPU or Intel's 80-series CPU. Hereinafter, it is assumed that the MCU 180 is comprised of the Motorola 68-series CPU or the Intel 80-series CPU. The MCU 180 may use another CPU or digital signal processor (DSP) and is not limited to the two kinds identified herein.

The data bus 190 is variable in bus width in accordance with an interface mode of the MCU 180. For instance, the data bus 190 has a data bus width of 8, 9, 16, or 18 bits of image data.

If image data is RGB data, it may vary in size by an RGB gray level. When each R, G, and B data is 6 bits, RGB data transferring 1-pixel information of the LCD panel 120 is 18 bits. For transferring these 18 bits of RGB data at a time, the data bus 190 is needed to have 18 bits of bus width. In one case, 18-bit data is divided and transferred over a data bus having a 9-bit bus width.

The data bus 190 is able to transfer RGB data of a 3-bit gray level in units of 9 bits, or RGB data of 9-bit gray level in units of 9 bits More specifically the data bus 190 can be designed to have a variety of bus widths in accordance with the MCU 180. Thus, the LCD driver 140 has to determine an operation mode in accordance with an interface type of the MCU 180.

Figure 3:
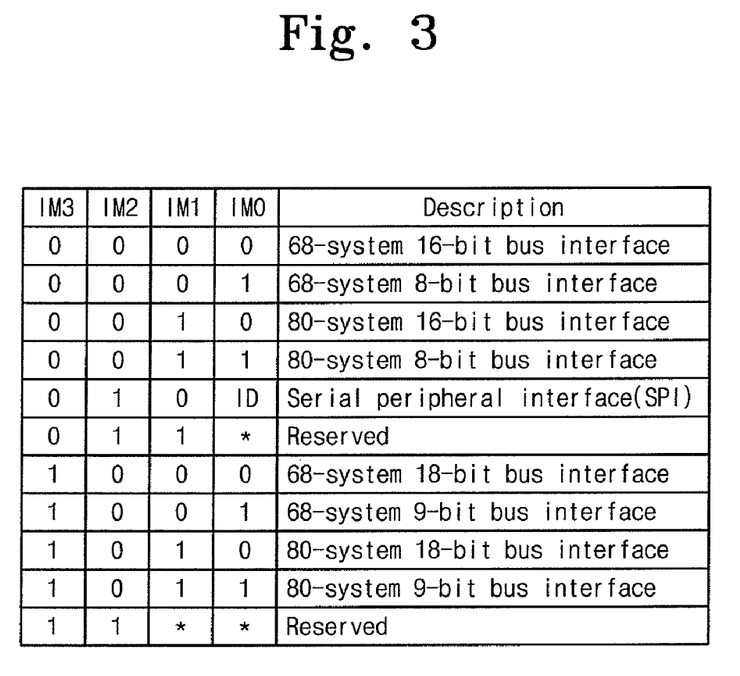
FIG. 3 is a table defining operation modes of the display system shown in FIG. 2.

FIG. 3 is a table defining operation modes of the display system 100 shown in FIG. 2. Referring to FIG. 3, the display device 110 of FIG. 2 differentiates the Motorola 68-series CPU from the Intel 80-series CPU by the mode set pins IM0~IM3. The mode set pins IM0~IM3 are also used to determine a serial peripheral interface (SPI) mode and a width of the data bus. In FIG. 3, 'ID' is used to determine a 1-bit signal inserted while making a reference pattern in the SPI interface mode And, 'Reserved' means an unused mode.

An interface mode of the MCU 180 of FIG. 2 may be set to 8-bit, 9-bit, 16-bit, 18-bit, or SPI type. In this exemplary embodiment, SPI means a general communication protocol operating in serial succession, transferring commands and image data to the display device 110 by way of serial data lines.

As an example, assuming that the MCU 180 is associated with an 80-system 8-bit bus interface, the mode set pins are established in pins IM[3:0]=0011. An operating feature of the display device 110 in this case will be described in conjunction with FIG. 4. Assuming that the MCU 180 is associated with an 80-system 16-bit bus interface, the mode set pins are established pins in IM[3:0]=0010. An operating feature of the display device 110 in this case will be described in conjunction with FIG. 5.

The display device 110 is required to set an operation mode in correspondence with an interface mode of the MCU 180. For this correspondency, the display device 110 needs the four mode set pins IM0~IM3 as shown in the table of FIG. 3. But, according to a change of the MCU 180 in kind, the mode set pins must be rearranged, thereby increasing a cost for manufacturing. Further, if a multiplicity of the mode set pins are externally exposed they are susceptible to external noises such as electromagnetic interference (EMI), thereby extending the probability of malfunction.

Figure 4:
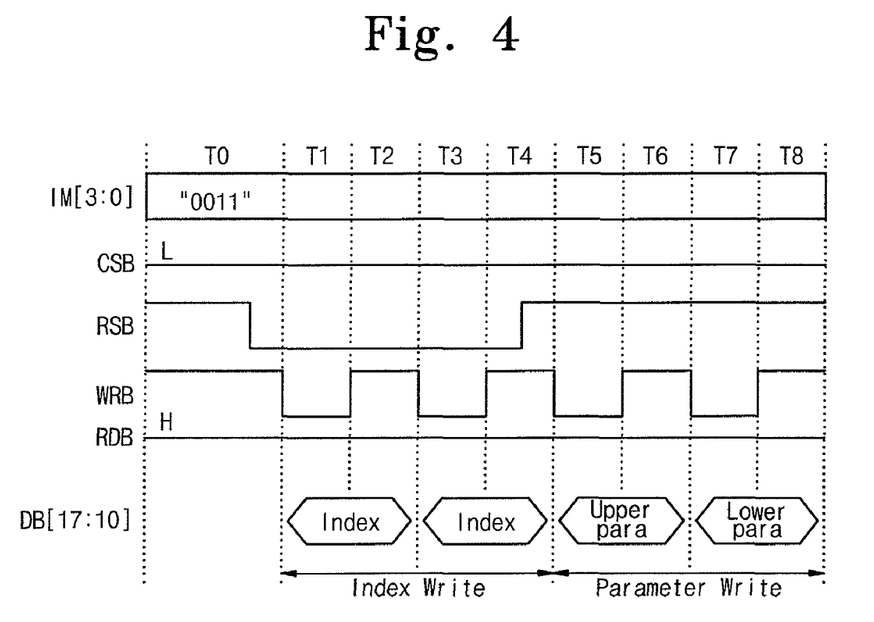
FIG. 4 is a timing diagram showing an operation of the display device if the microcontrol unit shown in FIG. 2 is associated with an 80-series 8-bit bus interface.

FIG. 4 is a timing diagram showing an operation of the display device 110 if the MCU 180 shown in FIG. 2 is associated with an 80-series 8-bit bus interface. Referring to FIG. 4, the mode set pins of the display device 110 are established in IM[3:0]=0011.

Hereinafter, the MCU 180 is assumed to transfer 16-bit indexes and 16-bit parameters through the data bus 190 shown in FIG. 2. In this exemplary embodiment, parameters are instructions and indexes are addresses noting locations storing the parameters. The indexes are stored in the index registers 141 and 142 of FIG. 2 and the parameters are stored in the parameter registers 143 and 144 of FIG. 2. The data bus 190 is configured of 8 bits in bus width. Thus, the MCU 180 transfers a 16-bit index twice in units of 8 bits, then the MCU 180 transfers a 16-bit parameter twice in units of 8 bits.

In FIG. 4, CSB represents a chip selection signal for enabling the LCD driver 140. The chip selection signal CSB is activated with a logical low level ('0'). RSB represents a signal used for differentiating between an index and a parameter while transferring the index and parameter through the data bus DB. The signal RSB transfers an index when it is a low level, and transfers a parameter when it is a high level. WRB is a signal for writing an index and a parameter, and RDB is a reading signal. The signals WRB and RDB are variable in operation according to whether the MCU 180 is corresponding with the 80-series or 60-series interface mode.

If the kind of MCU 180 is the Intel 80-series, the writing and reading signals, WRB and RDB, are independently activated for writing and reading an index and a parameter respectively. More specifically, these signals are enabled in logical low levels, that is, active-row signals. A trigger time of the writing signal WRB from a low to a high level is when an index and a parameter are each stored in the index and parameter registers.

If the kind of MCU 180 is the Motorola 68-series, the reading signal RDB functions as an enabling signal for writing and reading operations. A reading operation is conducted when the writing signal WRB becomes a high level. A writing operation is conducted when the writing signal WRB becomes a low level. While the writing and reading signals WRB and RDB are assumed as being sensitively triggered at pulse edges, they may be more sensitive to an overall voltage level.

Referring to FIG. 4, at time T0, the mode set pins IM[3:0] are arranged to correspond with the 80-series 8-bit bus interface mode. At time T1, the signals CSB, RSB, and WRB are ail low levels, data are written into the upper index register 141 of FIG. 2 from the data bus DB[17:10]. At time T3, data are written into the lower index register 142 of FIG. 2 from the data bus DB[17:10]. At time T5, the signal RSB rises to a high level. Then, the data are written into the upper parameter register 143 of FIG. 2 from the data bus DB[17:10]. At time T7, the data are written into the lower parameter register 144 of FIG. 2 from the data bus DB[17:10].

As shown in FIG. 4, in the condition that the mode set pins IM0~IM3 are established as '0011', the display device 110 exchanges data with the MCU 180 in the 80-series 8-bit bus interface mode. During this operation, the MCU 180 transfers an index and parameter twice in units of 8 bits through the data bus DB[17:10] of 8-bit bus width.

FIG. 5 is a timing diagram showing an operation of the display device 110 if the MCU 180 shown in FIG. 2 is associated with the 80-series 16-bit bus interface. Referring to FIG. 5, the mode set pins of the display device are established as IM[3:0]=0010.

Referring to FIG. 5, at time T0, the mode set pins IM[3:0] are arranged to correspond with the 80-series 16-bit bus interface mode. At time T1, 16-bit data are written into the index registers 141 and 142 of FIG. 2 from the data bus DB[17:0]. At time T3, 16-bit data are written into the parameters 143 and 144 of FIG. 2. As shown in FIG. 5, in the condition that the mode set pins IM0~IM3 are established as '0010', the display device 110 exchanges data with the MCU 180 in the 80-series 16-bit bus interface mode. During this operation, the MCU 180 transfers an index and parameter in the unit of 16 bits at a time.

The display device 110 illustrated in FIG. 2 configures an interface mode and data bus width of the MCU only by means of the mode set pins. As described above, however, using only the mode set pins in configuring an interface mode is regarded as causing several problems. So, with a purpose of reducing the number of the mode set pins, an exemplary embodiment of the present invention is embodied as utilizing indexes and parameters transferred into the display device 110 from the MCU 180.

More specifically, a pin for configuring an interface mode is removed from the mode set pins and information about a data bus width is transferred to the display device 110 by means of indexes and parameters. This feature of configuring a bus width by indexes and parameters will be explained in detail in conjunction with FIGS. 6 through 9.

Figure 6:
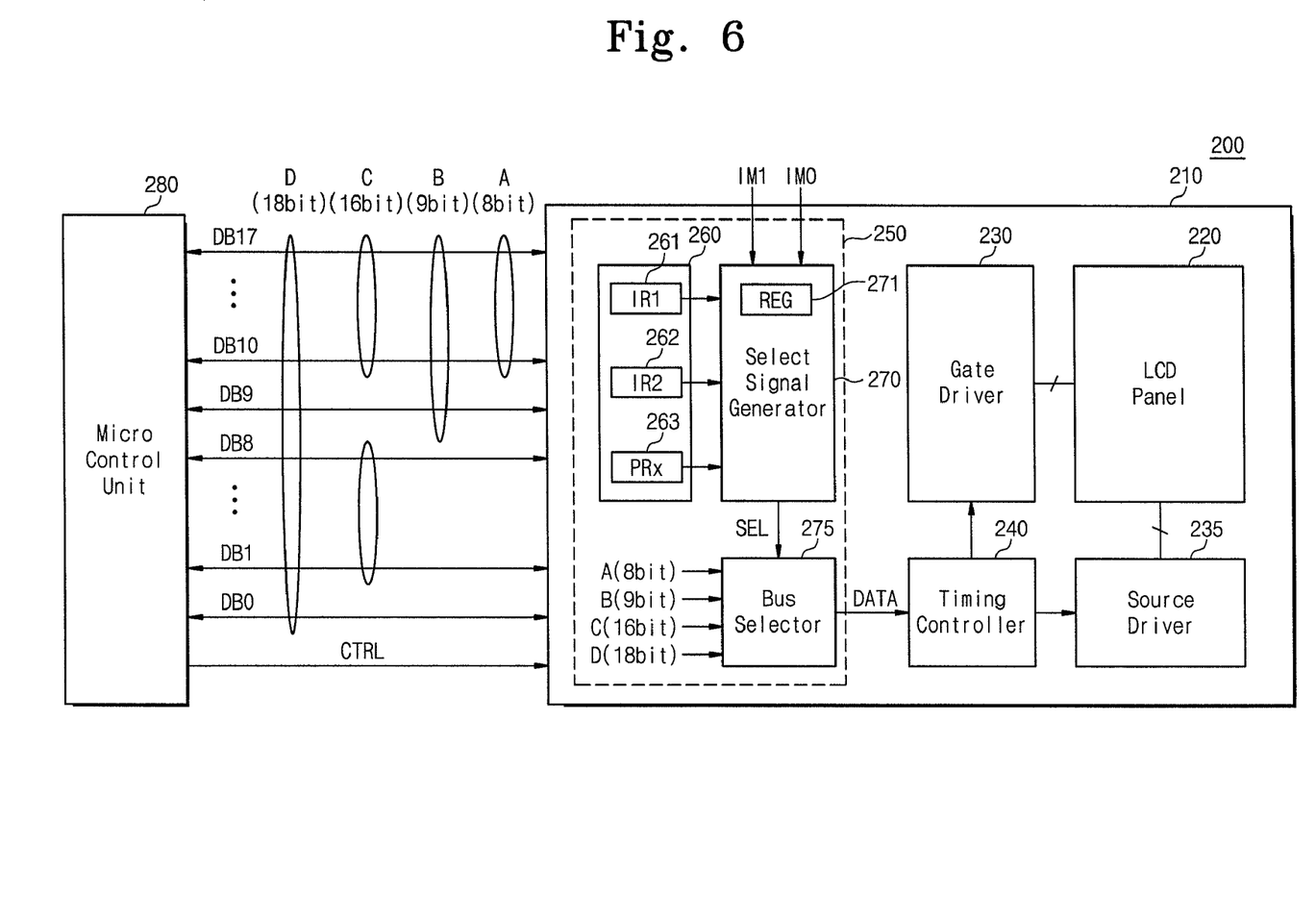
FIG. 6 is a block diagram illustrating a display system including a display device in accordance with an exemplary embodiment of the present invention.

FIG. 6 illustrates a display system including a display device in accordance with an exemplary embodiment of the present invention. Referring to FIG. 6, the display system 200 is comprised of a display device 210 and an MCU 280. The MCU 280 controls an operations of the display device 210 through a control signal CTRL and transfers data by way of a data bus DB0~DB17.

A width of the data bus is variable in accordance with an interface mode of the MCU 280. FIG. 6 exemplarily shows four types of data bus width. The bus width type A is configured to transfer 8-bit data by way of the data bus DB10~DB17. The bus width type B is configured to transfer 9-bit data by way of the data bus DB9~DB17. The bus width type C is configured to transfer 16-bit data by way of the data bus DB10~DB17 and DB1~DB8. The bus width type D is configured to transfer 18-bit data by way of the data bus DB0~DB17.

The display device 210 establishes an operation mode by means of two mode set pins IM0 and IM1. For example, mode set pin IM1 is used to determine a serial or parallel transfer mode, and mode set pin IM0 is used to determine the 80-series or 68-series interface mode. The display device 210 renders the data bus to be conductive in one of the types A through D by means of an index and parameter provided from the MCU 280, which will be described later.

Referring again to FIG. 6, the display device 210 is comprised of an LCD panel 220, a gate driver 230, a source driver 235, and a timing controller 240. Internal structures and operations of these components are well known by those of ordinary skill in the art, so these components will not be detailed further.

The display device 210 according to an exemplary embodiment of the present invention further includes a bus width configuration circuit 250. In FIG. 6, the gate driver 230, the source driver 235, the timing controller 240, and a bus width configuration circuit 250 may be integrated in a single semiconductor chip. Referring to FIG. 6, the bus width configuration circuit 250 is comprised of a register block 260, a selection signal generator 270, and a bus selector 275.

The register block 260 includes index registers 261 and 262 and a parameter register 263. The index registers 261 and 262 store indexes and the parameter register 263 stores parameters. In this exemplary embodiment, the index is an address of a location storing a parameter. The parameter is data for conducting an instruction, that is, a command.

The index is composed of 16 bits, divided into an upper index of 8 bits and a lower index of 8 bits. Thus, when the index is transferred by way of the 8-bit data bus A, the upper and lower indexes are divisionally transferred therethrough. Otherwise, when the index is transferred by way of the 16-bit data bus C, it is transferred therethrough at one time.

The parameter is also composed of 16 bits. In the case of the 8-bit data bus A, the parameter is divisionally transferred with its upper and lower parameters. Through the 16-bit data bus, the upper and lower parameters are transferred at one time. Transfer patterns of the index and parameter will be detailed in conjunction with FIGS. 8 and 9.

The selection signal generator 270 links with the mode set pins IM0 and IM1 and outputs of the register block 260 and generates a selection signal SEL for determining a bus width. The selection signal generator 270 includes an internal register 271 for storing information about an interface mode. The bus selector 275 selects one of the data bus types A through D in response to the selection signal SEL.

The display device 210 shown in FIG. 6 does not have any pin for configuring a bus width among the mode set pins. The display device 210 determines a data bus width by means of an index and parameter transferred from the MCU 280. In this manner, the display device of this exemplary embodiment of the present invention is able to reduce the number of mode set pins, while maintaining an established interface mode.

Figure 7:
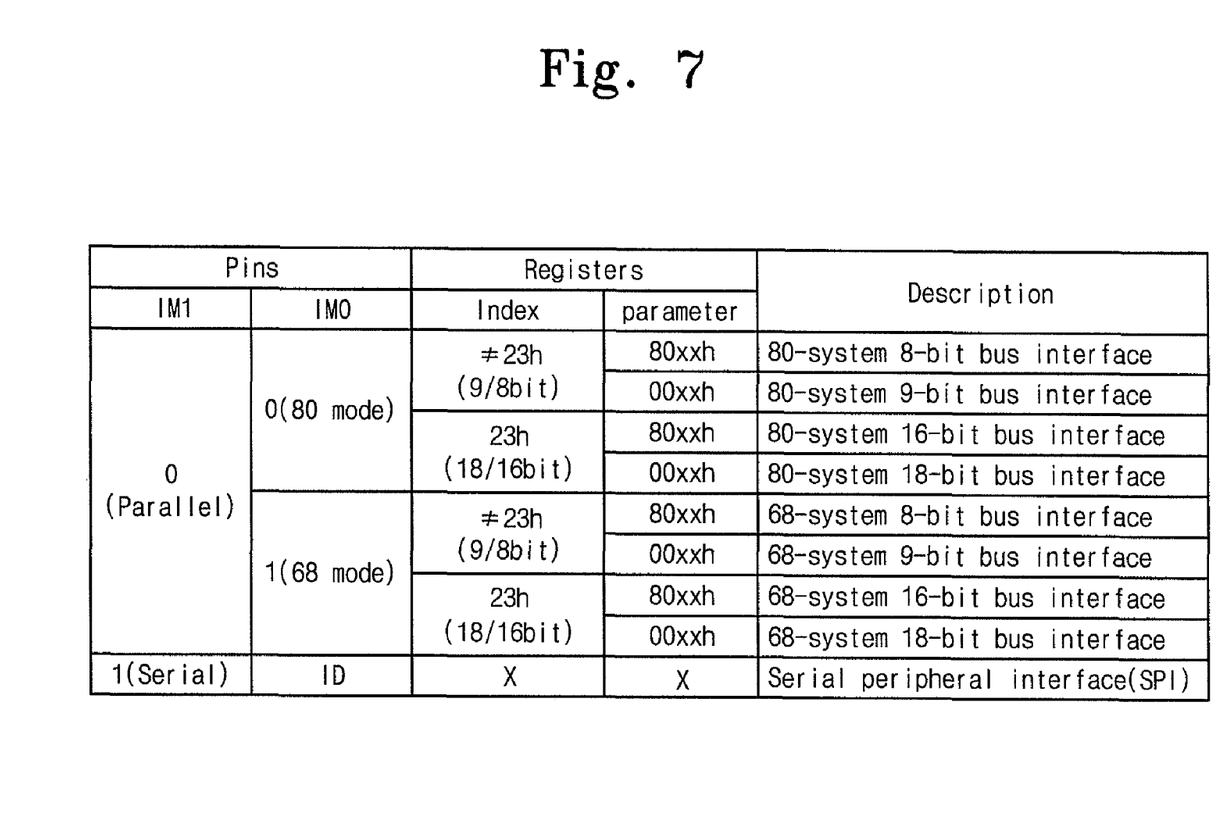
FIG. 7 is a table defining operation modes of the display device shown in FIG. 6.

FIG. 7 is a table defining operational modes of the display device shown in FIG. 6. Compared to FIG. 3, the number of mode set pins is reduced by two to IM[1:0] from IM[3:0]. The mode set pin IM1 is used to determine that the MCU 280 is operable in a serial or parallel interface mode. The mode set pin IM0 is used to determine that the MCU 280 belongs to the Intel 80-series or the Motorola 68-series.

Referring again to FIG. 7, if an index stored in the upper index register 261 of FIG. 6 is 23h, a bus width is configured in 18 or 16 bits. Unless the index is 23h, for example 24h, the bus width is otherwise configured in 9 or 8 bits. The final value of the bus width is determined by a parameter stored in the parameter register 263 of FIG. 6. For instance, if a parameter is 80xxh (x means "don't care"), the bus width is 8 or 16 bits. If the parameter is 00xxh, the bus width is 9 or 18 bits.

Even though indexes and parameters are used to configure the bus width, it is also permissible to use only one of them in configuring a bus width. For example, if the index stored in the upper index register 261 is 23h, the MCU 280 is associated with an interface mode of the 80-series 8-bit bus width. If the index of the register 261 is 24h, not 23h, the MCU 280 is associated with an interface mode of the 80-series 9-bit bus width. Other interlace modes of the MCU 280 can be configured by varying index values. Also an interface mode of the MCU 280 may be set by means of parameters.

As the display system 200 transfers an index and parameter in a condition without determining a bus width, a common bus is used in default In this exemplary embodiment of the present invention, the upper data bus DB[17:10] is used as the common bus. More specifically, from the case described above, an index stored in the upper index register 261 is transferred to the common bus DB[17:10].

Figure 8:
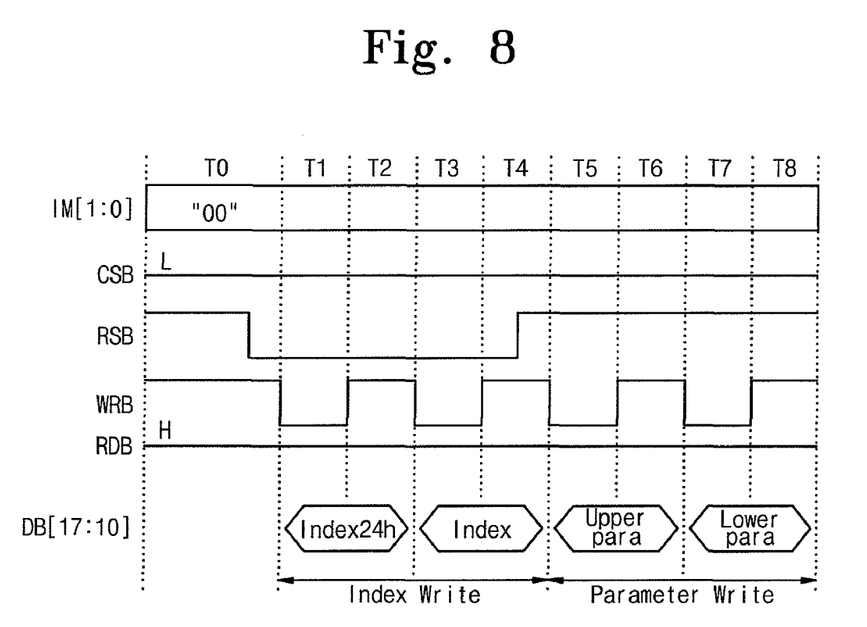
FIG. 8 is a timing diagram showing an operation of the display device if the microcontrol unit shown in FIG. 6 is associated with an 80-series 8-bit bus interface.

FIG. 8 is a timing diagram showing an operation of configuring an 8-bit bus width by the display device 210 if the MCU 280 shown in FIG. 6 is associated with the 80-series 8-bit bus interface. Referring to FIG. 8, the mode set pins of the display device 210 are set on IM[1:0]=00. Referring to FIG. 7, if IM[1:0]=00, the MCU 280 belongs to the 80-series CPU.

Referring to FIG. 8, at time T0, the mode set pins IM[1.0] are established in correspondence with the 80-series CPU. At time T1, as the signals CSB, RSB, and WRB are all at low levels, data are written into the upper index register 261 from the data bus DB[17:10]. Since the MPU 280 is operable in the 80-series 8-bit bus interface mode, an index stored in the upper index register 26*i* is not 23h but is 24h. The selection signal generator 270, with reference to the index 24h stored in the upper index register 261, determines that the MCU 280 is associated with an 8-bit or 9-bit bus width.

At time T3, data are written into the lower index register 262 of FIG. 2 from the data bus DB[17:10]. An index, for example 03h, stored in the lower index register 262 denotes a storage location of a parameter to be input next. In other words, the index 03h means an address of a parameter.

At time T5, the signal RSB goes to a high level. During this event, data are written from the data bus DB[17:10] into the parameter register 263 of FIG. 6. At time T7, data are written from the data bus DB[17:10] into the parameter register 263. In this exemplary embodiment, the parameter register 263 is able to store 16-bit data. As described above, the parameter register 263 stores 16-bit data of the parameter in two operations in units of 8 bits.

If a parameter stored in the parameter register 263 is 80xxh (x means "don't care"), the data bus is configured with 8 bits in width. If a parameter is 00xxh, the data bus is configured with 9 bits in width. These parameter data 80xxh or 00xxh are proposed in an exemplary embodiment using an MSB in order to differentiate the 8-bit and 9-bit bus widths from each other. An exemplary embodiment of the present invention may use another bit, for example an LSB, in order to differentiate an 8-bit bus width from a 9-bit bus width, and a 16-bit bus width from an 18-bit bus width.

As can be seen from FIG. 8, if the mode set pins IM[1:0] are established as '00', the display device 210 exchanges data with the MCU 280 having the 80-series interface mode The display device 210 determines that the MCU 280 is associated with an 8-bit or 9-bit interface mode with reference to an index, for example, 24h, input through the common bus DB[17:10]. Exemplarily, the display device 210 determines that the MCU 280 is associated with the 8-bit interface mode with reference to a parameter, for example 80xxh. By way of this procedure according to an exemplary embodiment of the present invention, the MCU 280 is configured as using the 80-series 8-bit bus interface mode.

Figure 9:
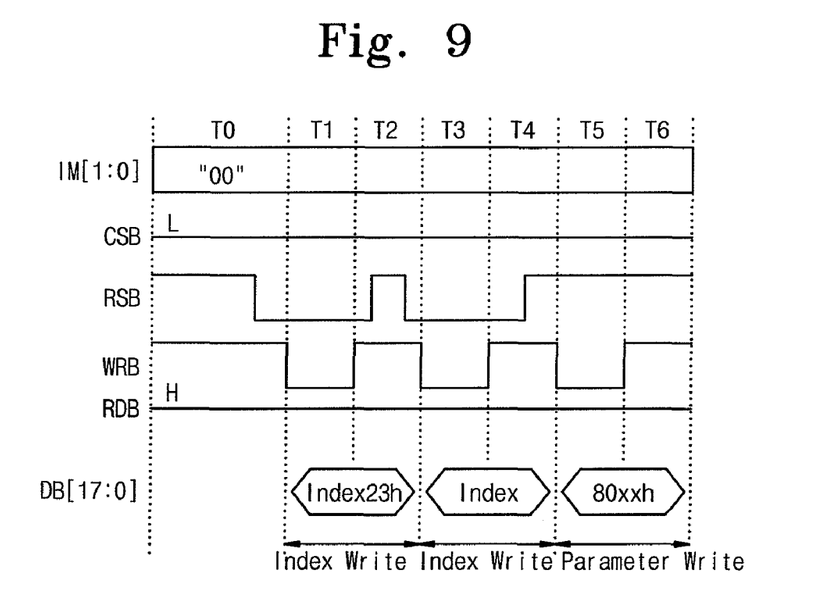
FIG. 9 is a timing diagram showing an operation of the display device if the microcontrol unit shown in FIG. 6 is associated with an 80-series 16-bit bus interface.

FIG. 9 is a timing diagram showing an operation of configuring a 16-bit bus interface width by the display device 210 if the MCU 280 shown in FIG. 6 is associated with an 80-series 16-bit bus interface. Referring to FIG. 9, the mode set pins of the display device 210 are established as IM[1:0]=00. Referring to FIG. 7, if the mode set pins IM[1:0] are established as "00", the MCU 280 is correspondent with the 80-series CPU.

Referring to FIG. 9, at time T0, the mode set pins IM[1:0] are configured for the 80-series CPU. At time T1, as the signals CSB, RSB, and WRB are all at low levels, data are written into the upper index register 261 from the common data bus DB[17:10]. Because the MPU 280 is operable in the 80-series 16-bit bus interface mode, an index stored in the upper index register 261 is 23h. The selection signal generator 270 determines, with reference to the index 23h stored in the upper index register 261, that the MCU 280 is associated with a 16-bit or 18-bit bus width. The selection signal generator 270 stores a value of the selected data bus width into the internal register 271.

Because the interface mode has been changed from the first 8-bit mode to a 16-bit or 18-bit mode, the display device 210 resumes the 16-bit or 18-bit interface mode at time T3. Thus, at the time T3, data are written into the upper and lower index registers 261 and 262 from the data bus DB[17:0]. An index, for example, 03h, stored in the lower index register 262 denotes a storage location of a parameter to be input next. In other words, the index 03h means an address of a parameter.

At time T5, the signal RSB goes to a high level. During this event, data are written from the data bus DB[17:0] into the parameter register 263 of FIG. 6. In this exemplary embodiment, the parameter register 263 stores 16-bit data at a time. As the parameter stored in the parameter register 263 is now 80xxh, the data bus is configured in a 16-bit bus width. If the parameter is 00xxh, the data bus is configured in an 18-bit bus width.

As illustrated in FIG. 9, if the mode set pins IM[1:0] are established as "00", the display device 210 exchanges data with the MCU 280 that joins to the 80-series interface. The display device 210 determines that the MCU 280 is associated with the 16-bit or 18-bit bus interface, referring to the index 23h input through the common data bus DB[17:10]. The display device 210 then determines that the MCU 280 is associated with the 16-bit bus width, referring to the parameter 80xxh. The exemplary embodiment of the present invention offers a feature of setting the MCU 280 to be configured in the 80-series 16-bit bus interface mode.

Figure 10:
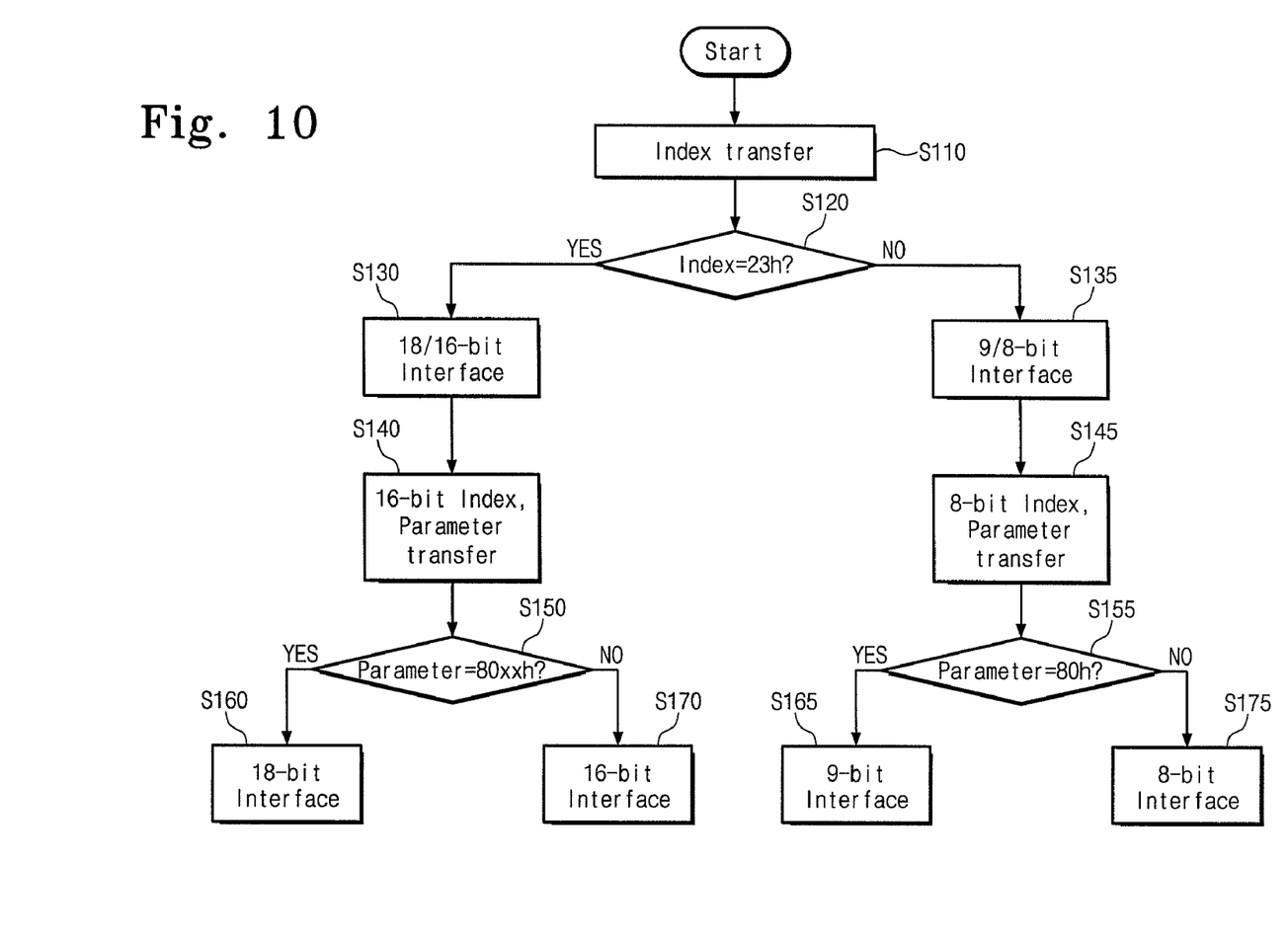
FIG. 10 is a flow chart showing a bus width configuration method for the display device in accordance with an exemplary embodiment of the present invention.

FIG. 10 is a flow chart showing a bus width configuration method for the display device in accordance with an exemplary embodiment of the present invention. The display device 210 uses the 8-bit common data bus DB[17:10] in default. More specifically, the display device 210 begins protocols with the MCU 280 through the default 8-bit common data bus of A width.

The MCU 280 transfers a first index through the 8-bit common data bus (step S110). The first index is stored in the upper index register 261 shown in FIG. 6. Then, it determines whether the transferred index is 23h (step S120). If the transferred index is 23h (YES), the display device 210 is associated with the 18-bit or 16-bit interface mode (step S130). If the transferred index is not 23h (NO), the display device 210 is associated with the 9-bit or 8-bit interface mode (step S135). Information about the determined interface mode is stored in the internal register 271 of the selection signal generator 270.

The MCU 280 then transfers an index and a parameter (steps S140 and S145). In this exemplary embodiment, the index is an address for designating a storage position of the parameter. If the interface mode is configured in a 9-bit or 8-bit bus width, an 8-bit index is stored in the lower index register 262. Otherwise, if the interface mode is configured in an 18-bit or 16-bit bus width, a 16-bit index is stored in the upper and lower index registers 261 and 262. The parameter is stored in the parameter register 263.

In the case of selecting the 18-bit or 16-bit interface mode, the parameter register 263 stores a 16-bit parameter. With reference to a value of the parameter, it finally selects one from the 18-bit and 16-bit interface modes (steps S160 and S170).

Whereas the above-described exemplary embodiment is described in relation to the 8-bit common data bus, exemplary embodiments of the present invention are applicable in various forms without restricting a width of the common data bus. Further, a bus width according to the exemplary embodiments of present invention is also determined by an order of configuring index and parameters, not simply by established values of the index and parameters.

According to exemplary embodiments of the present invention as described above, since index and parameters are used to transfer information for configuring a data bus width, it is possible to reduce the number of mode set pins used for determining the data bus width. Therefore, exemplary embodiments of the present invention permit an interfacing operation with various types of MCU, minimizing the number of mode set pins for setting an operation mode.

While there has been illustrated and described what are presently considered to be exemplary embodiments of the present invention, it will be understood by those of ordinary skill in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular exemplary embodiments disclosed, but that the invention include all embodiments falling within the scope of the appended claims.

What is claimed is:

1. A bus width configuration circuit comprising:
    at least one control bus transmitting at least one control signal;
    a data bus comprising a plurality of bi-directional data buses supporting a variable bus width to transmit data in response to the at least one control signal, the plurality of bi-direction data buses having at least two different bus widths for supporting the variable bus width;
    a register block storing an index and parameter inputted through a default common bus comprising one or more of the plurality of bi-directional data buses; and
    a bus width control circuit selecting a bus width of the variable bus width via the at least one control bus based on the index and parameter stored in the register block and conducting data communication by means of the selected bus width corresponding to at least one of the plurality of bi-directional data buses rendered conductive by the bus width control circuit.

2. The bus width configuration circuit as set forth in claim 1, wherein the bus width control circuit comprises:
   a selection signal generator receiving the index and parameter stored in the register block and generating a bus selection signal; and
   a bus selector operating to select the bus width of the variable bus width in response to the bus selection signal.

3. The bus width configuration circuit as set forth in claim 2, wherein the variable bus width is configured in the selected bus width for a common bus.

4. The bus width configuration circuit as set forth in claim 2, wherein the register block comprises an upper index register, a lower index register, and a parameter register,
   wherein the selection signal generator operates to generate the bus selection signal based on the index stored in the upper index register or lower index register, or based on the parameter stored in the parameter register.

5. The bus width configuration circuit as set forth in claim 1, wherein the two different bus widths include 8-bit, 9-bit, 16-bit, and 18-bit widths,
   wherein the bus width control circuit selects at least one of the two different bus widths.

6. A display device communicating with a microcontrol unit by data, comprising:
   a panel having a plurality of pixels; and
   a display driver operating to drive the panel,
   wherein the display driver comprises:
      at least one control bus transmitting at least one control signal;
      a plurality of bi-directional data buses with a variable bus width to transmit data in response to the at least one control signal, the plurality of bi-direction data buses having at least two different bus widths for supporting the variable bus width;
      a register block storing an index and parameter inputted from the microcontrol unit through a default common bus comprising one or more of the plurality of bi-directional data buses; and
      a bus width control circuit selecting a bus width of the variable bus width corresponding to a selection of at least one of the plurality of bi-directional data buses based on the index and parameter stored in the register block and conducting data communication with the microcontrol unit by means of the selected bus width of the variable bus width corresponding to at least one of the plurality of bi-directional data buses rendered conductive by the bus width control circuit.

7. The display device as set forth in claim 6, which further comprises: a mode set pin establishing one of serial and parallel communication modes between the microcontrol unit and the display driver.

8. The display device as set forth in claim 6, which further comprises: a mode set pin establishing the microcontrol unit as one of an Intel 80-series CPU and a Motorola 68-series CPU.

9. The display device as set forth in claim 6, wherein the variable data bus width is configured in one of the plurality of bus widths for a common bus.

10. The display device as set forth in claim 6, wherein the variable bus width includes 8-bit, 9-bit, 16-bit, and 18-bit widths, wherein the bus width control circuit selects the bus width of the variable bus width.

11. The display device as set forth in claim 6, wherein the register block comprises an upper index register, a lower index register, and a parameter register,
   wherein the bus width control circuit operates to generate the bus selection signal based on the index stored in the upper index register or lower index register, or based on the parameter stored in the parameter register.

12. A method of configuring a bus width of a display device including at least one control bus transmitting at least one control signal, a plurality of bi-directional data buses supporting a variable bus width to transmit data in response to the at least one control signal, a register block storing an index and parameter, and a bus width control circuit conducting data communication with a microcontrol unit in one of the plurality of bus widths, the method comprising:
   receiving the index and parameter from the microcontrol unit through a default common bus comprising one or more of the bi-directional data bus and storing the index and parameter into the register block;
   selecting a data bus width of the variable data bus width corresponding to a selection of at least one of the bi-directional data buses rendered conductive by the bus width control circuit, the plurality of bi-direction data buses having at least two different bus widths for supporting the variable bus width, with reference to the index or parameter stored in the register block; and
   communicating with the microcontrol unit by data in the selected bus width.

13. The method as set forth in claim 12, wherein the plurality of bi-directional data buses are configured in one of the plurality of bus widths for a common bus through which a first index is transferred.

14. The method as set forth in claim 12, wherein the display unit includes one or more mode set pins and establishes a setting of the mode set pins before receiving the index or the parameter.

15. The method as set forth in claim 14, further comprising: determining an interface mode from serial and parallel communication modes between the microcontrol unit and the display device by means of the mode set pins.

16. The method as set forth in claim 14, further comprising: determining a type of the microcontrol unit as an Intel 80-series CPU or a Motorola 68-series CPU by means of the mode set pins.

17. The method as set forth in claim 12, wherein the plurality of two different bus widths includes 8-bit, 9-bit, 16-bit, and 18-bit widths,
   wherein selecting the bus width of the variable bus width is carried out with selecting at least one of the two different bus widths.

18. The bus width configuration circuit as set forth in claim 1, wherein the index and parameter indicates information of a microcontrol unit communicating with the bus width configuration circuit.

19. The display device as set forth in claim 6, wherein the index and parameter indicates information of the microcontrol unit.

20. The method as set forth in claim 12, wherein the index and parameter indicates information of the microcontrol unit.

* * * * *